(12) United States Patent
Wu et al.

(10) Patent No.: US 9,037,841 B2
(45) Date of Patent: May 19, 2015

(54) CONTROL CIRCUIT FOR TERMINAL ELECTRONIC DEVICE

(71) Applicants: Kang Wu, Shenzhen (CN); Bo Tian, Shenzhen (CN)

(72) Inventors: Kang Wu, Shenzhen (CN); Bo Tian, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 288 days.

(21) Appl. No.: 13/681,381

(22) Filed: Nov. 19, 2012

(65) Prior Publication Data

US 2013/0212412 A1 Aug. 15, 2013

(30) Foreign Application Priority Data

Feb. 14, 2012 (CN) .......................... 2012 1 0032314

(51) Int. Cl.
*H04L 15/12* (2006.01)
*G06F 15/177* (2006.01)
*H04L 12/12* (2006.01)
*G06F 1/32* (2006.01)

(52) U.S. Cl.
CPC .............. *H04L 12/12* (2013.01); *G06F 1/3209* (2013.01); *Y02B 60/34* (2013.01)

(58) Field of Classification Search
CPC ..... G06F 1/3209; G06F 1/3287; G06F 9/4416; G06F 9/4418; G06F 9/4401; G06F 15/177; Y02B 60/34; Y02B 60/1228; Y02B 60/186; H04L 12/12
See application file for complete search history.

(56) References Cited

U.S. PATENT DOCUMENTS

| | | | |
|---|---|---|---|
| 2005/0086460 A1* | 4/2005 | Huang | 713/2 |
| 2006/0282690 A1* | 12/2006 | Cromer et al. | 713/300 |
| 2008/0092248 A1* | 4/2008 | He et al. | 726/36 |
| 2008/0177912 A1* | 7/2008 | Onda | 710/68 |

* cited by examiner

*Primary Examiner* — Dennis M Butler
(74) *Attorney, Agent, or Firm* — Novak Druce Connolloy Bove + Quigg LLP

(57) ABSTRACT

A control circuit for a terminal electronic device includes a network card, a wakeup circuit, a south bridge, a restart circuit, and a controller. The network card receives a remote control command from a remote apparatus, and generates a wakeup signal if the terminal electronic device is turned off. The wakeup circuit activates the terminal electronic device according to the wakeup signal. The south bridge provides a low voltage power signal if the terminal electronic device is turned off. The controller receives the wakeup signal and the low voltage power signal, and outputs a first control signal to the restart circuit to disable the restart circuit.

10 Claims, 1 Drawing Sheet

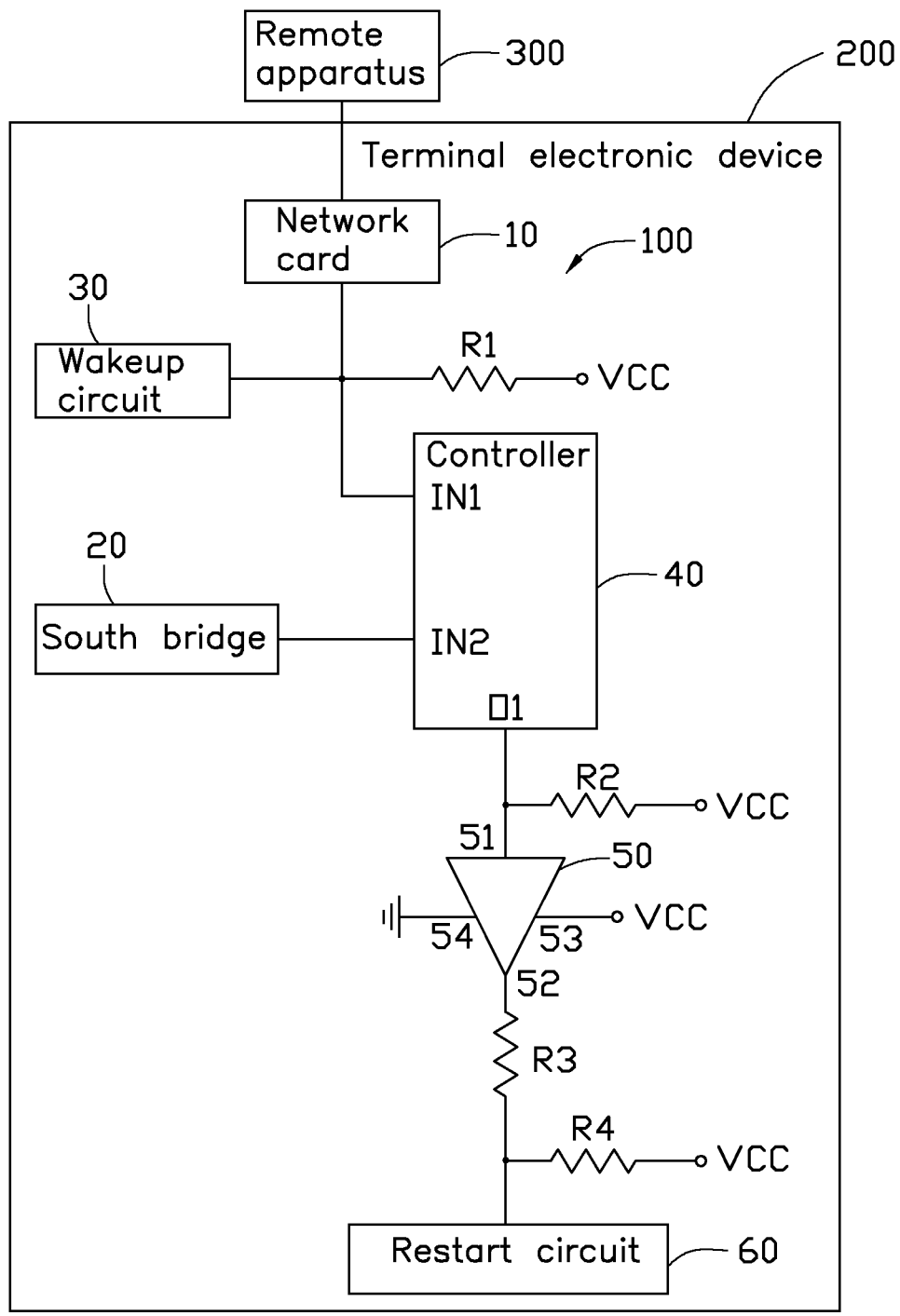

CONTROL CIRCUIT FOR TERMINAL ELECTRONIC DEVICE

BACKGROUND

1. Technical Field

The disclosure generally relates to control circuits, and particularly to a control circuit for a terminal electronic device.

2. Description of the Related Art

Terminal electronic devices, such as servers, often allow remote accesses by a remote apparatus, such as a personal computer. When the terminal electronic device is shutdown, the remote apparatus can activate the terminal electronic device, for example. The remote apparatus can also control the terminal electronic device to restart when a malfunction occurs during a boot-strap state of the terminal electronic device. However, a falling edge of a wakeup signal used to activate the terminal electronic device may take a long time, and the wakeup signal may cause the terminal electronic device to abnormally restart.

Therefore, there is room for improvement within the art.

BRIEF DESCRIPTION OF THE DRAWINGS

Many aspects of the present disclosure can be better understood with reference to the drawing. The components in the drawings are not necessarily drawn to scale, the emphasis instead being placed upon clearly illustrating the principles of the present embodiments.

The FIGURE is a circuit view of a control circuit for a terminal electronic device, according to an exemplary embodiment.

DETAILED DESCRIPTION

The FIGURE shows a control circuit 100 of one embodiment. The control circuit 100 can be used in a terminal electronic device 200 such as a server or a container data center (CDC), for example. The terminal electronic device 200 allows remote accesses by a remote apparatus 300 such as a personal computer, thus, the remote apparatus 300 can output a remote control command to activate or restart the terminal electronic device 200.

The control circuit 100 includes a network card 10, a south bridge 20, a wakeup circuit 30, a controller 40, an isolation circuit 50, and a restart circuit 60.

The network card 10 communicates with the remote apparatus 300 via transmission control protocol/internet protocol (TCP/IP) to receive the remote control command from the remote apparatus 300. When the network card 10 receives the remote control command, the network card 10 accordingly generates a restart signal if the terminal electronic device 200 is in a boot-strap state, and generates a wakeup signal if the terminal electronic device 200 is turned off.

In one exemplary embodiment, the south bridge 20 is a platform controller hub (PCH). The south bridge 20 provides a power signal to the controller 40. When the terminal electronic device 200 is in the boot-strap state, the power signal is a high voltage signal (e.g., logic 1), and when the terminal electronic device 200 is turned off, the power signal is a low voltage signal (e.g., logic 0).

The wakeup circuit 30 is electronically connected to the network card 10 to receive the wakeup signal. The wakeup circuit 30 is configured to activate the terminal electronic device 200 according to the wakeup signal, and thus the terminal electronic device 200 can be turned on.

In one exemplary embodiment, the controller 40 is a complex programmable logic device (CPLD). The controller 40 includes a first input pin IN1, a second input pin IN2, and an output pin O1. The first input pin IN1 is electronically connected to a power supply VCC via a first resistor R1, and is electronically connected to the network card 10 to receive the restart signal and the wakeup signal. The second input pin IN2 is electronically connected to the south bridge 30 to receive the power signal. The output pin O1 is electronically connected to the power supply VCC via a second resistor R2, and is electronically connected to the isolation circuit 50.

The controller 40 outputs a first control signal or a second control signal according to the power signal, the restart signal, and the wakeup signal. In the embodiment, when the terminal electronic device 200 is turned off, the power signal is a low voltage signal, the first input pin Ni receives the wakeup signal, and the output pin O1 outputs the first control signal. When the terminal electronic device 200 is in the boot-strap state, the power signal is a high voltage signal, the first input pin IN1 receives the restart signal, and the output pin O1 outputs the second control signal. In one exemplary embodiment, the first control signal is logic "1", and the second control signal is logic "0".

The isolation circuit 50 is electronically connected between the controller 40 and the restart circuit 60, to isolate ripples of the first control signal and the second control signal. In one exemplary embodiment, the isolation circuit 50 includes an input terminal 51, an output terminal 52, a power terminal 53, and a grounding terminal 54. The input terminal 51 is electronically connected to the output pin O1 of the controller 40. The output terminal 54 is electronically connected to the restart circuit 60. The power terminal 53 is electronically connected to the power supply VCC, and the grounding terminal 54 is connected to ground.

The restart circuit 60 is directed by the controller 40 to restart the terminal electronic device 200 or not. In one exemplary embodiment, the restart circuit 60 is electronically connected to the output terminal 52 of the isolation circuit 50 via a third resistor R3 to receive the first control signal and the second control signal output from the controller 40, and the restart circuit 60 is electronically connected to the power supply VCC via a fourth resistor R4. If the restart circuit 60 receives the second control signal, the restart circuit 60 is enabled (e.g., turn on), and then the restart circuit 60 restarts the terminal electronic device 200. The restart circuit 60 is disabled (e.g., turn off) if the restart circuit 60 receives the first control signal and thus cannot restart the terminal electronic device 200.

When a malfunction occurs during the boot-strap state of the terminal electronic device 200, the remote apparatus 300 sends the remote control command to the network card 10 to restart the terminal electronic device 200. Then, the network card 10 generates the restart signal, and the south bridge 20 provides the high voltage signal (e.g., logic 1). Thus, the controller 40 outputs the second control signal of logic "0" to the restart circuit 60, and the restart circuit 60 is enabled to restart the terminal electronic device 200.

When the terminal electronic device 200 is turned off, the remote apparatus 300 sends the remote control command to the network card 10 to activate the terminal electronic device 200. Then, the network card 10 generates the wakeup signal, and the wakeup circuit 30 activates the terminal electronic device 200 according to the wakeup signal, thus, the terminal electronic device 200 is turned on. Additionally, the south bridge 20 provides the low voltage signal (e.g., logic 0). Thus, the controller 40 outputs the first control signal of logic "1" to the restart circuit 60, and then the restart circuit 60 is disabled, and cannot restart the terminal electronic device 200. At this time period, the wakeup signal cannot cause the terminal electronic device 200 to restart even though a falling edge of the wakeup signal takes a long time.

In summary, the controller 40 outputs the second control signal according to the power signal and the restart signal to enable the restart circuit 60, and thus the terminal electronic device 200 can be restarted. Additionally, the controller 40 outputs the first control signal according to the power signal and the wakeup signal to disable the restart circuit 60, and thus the terminal electronic device 200 cannot be abnormally restarted by restart circuit 60 when the wakeup circuit 30 activates the terminal electronic device 200. Therefore, the terminal electronic device 200 is both efficient and steady.

Although numerous characteristics and advantages of the exemplary embodiments have been set forth in the foregoing description, together with details of the structures and functions of the exemplary embodiments, the disclosure is illustrative only, and changes may be made in detail, especially in the matters of arrangement of parts within the principles of disclosure to the full extent indicated by the broad general meaning of the terms in which the appended claims are expressed.

What is claimed is:

1. A control circuit for a terminal electronic device in communication with a remote apparatus, the control circuit comprising:
    a network card receiving a remote control command from the remote apparatus, and generating a wakeup signal according to the remote control command if the terminal electronic device is turned off;
    a south bridge providing a low voltage power signal if the terminal electronic device is turned off;
    a wakeup circuit electronically connected to the network card, and configured to activate the terminal electronic device;
    a restart circuit configured to restart the terminal electronic device; and
    a controller electronically connected to the network card, the south bridge, and the restart circuit;
    wherein the wakeup circuit receives the wakeup signal, and activates the terminal electronic device, the controller receives the wakeup signal and the low voltage power signal, and outputs a first control signal to the restart circuit according to the wakeup signal and the low voltage power signal, to disable the restart circuit.

2. The control circuit as claimed in claim 1, wherein the network card generates a restart signal if the terminal electronic device is in a boot-strap state, the south bridge provides a high voltage power signal if the terminal electronic device is in the boot-strap state, and the controller outputs a second control signal to the restart circuit according to the restart signal and the high voltage power signal, to enable the restart circuit.

3. The control circuit as claimed in claim 2, wherein the controller is a complex programmable logic device (CPLD).

4. The control circuit as claimed in claim 3, wherein the controller includes a first input pin, a second input pin, and an output pin, the first input pin is electronically connected to a power supply via a first resistor, and is electronically connected to the network card, the second input pin is electronically connected to the south bridge, the output pin is electronically connected to the power supply via a second resistor.

5. The control circuit as claimed in claim 4, further comprising an isolation circuit, wherein the isolation circuit is electronically connected between the controller and the restart circuit, to isolate ripples of the first control signal and the second control signal.

6. The control circuit as claimed in claim 5, wherein the isolation circuit includes an input terminal and an output terminal, the input terminal is electronically connected to the output pin of the controller, the output terminal is electronically connected to the restart circuit via a third resistor.

7. A control circuit for a terminal electronic device in communication with a remote apparatus, the control circuit comprising:
    a network card receiving a remote control command from the remote apparatus, the network card generating a wakeup signal according to the remote control command if the terminal electronic device is turned off, and generating a restart signal according to the remote control command if the terminal electronic device is in a boot-strap state;
    a south bridge providing a low voltage power signal if the terminal electronic device is turned off, and providing a high voltage power signal if the terminal electronic device is in the boot-strap state;
    a wakeup circuit electronically connected to the network card, and configured to activate the terminal electronic device;
    a restart circuit configured to restart the terminal electronic device; and
    a controller electronically connected to the network card, the south bridge, and the restart circuit;
    wherein the wakeup circuit receives the wakeup signal, and activates the terminal electronic device, the controller receives the wakeup signal and the low voltage power signal, and outputs a first control signal to the restart circuit according to the wakeup signal and the low voltage power signal, to disable the restart circuit; and
    wherein the controller receives the restart signal and the high voltage power signal, and outputs a second control signal to the restart circuit according to the restart signal and the high voltage power signal, to enable the restart circuit.

8. The control circuit as claimed in claim 7, wherein the controller includes a first input pin, a second input pin, and an output pin, the first input pin is electronically connected to a power supply via a first resistor, and is electronically connected to the network card, the second input pin is electronically connected to the south bridge, the output pin is electronically connected to the power supply via a second resistor.

9. The control circuit as claimed in claim 8, further comprising an isolation circuit, wherein the isolation circuit is electronically connected between the controller and the restart circuit, to isolate ripples of the first control signal and the second control signal.

10. The control circuit as claimed in claim 9, wherein the isolation circuit includes an input terminal and an output terminal, the input terminal is electronically connected to the output pin of the controller, the output terminal is electronically connected to the restart circuit via a third resistor.

* * * * *